(12) United States Patent
Lamers et al.

(10) Patent No.: US 8,373,985 B2
(45) Date of Patent: Feb. 12, 2013

(54) MOLDED ASSEMBLY

(75) Inventors: Ramon Lamers, Duisburg (DE); Albert Pegg, Cambridge (CA); Martin Mape, Waterloo (CA)

(73) Assignee: Research In Motion Limited, Waterloo (CA)

( * ) Notice: Subject to any disclaimer, the term of this patent is extended or adjusted under 35 U.S.C. 154(b) by 289 days.

(21) Appl. No.: 12/906,535

(22) Filed: Oct. 18, 2010

(65) Prior Publication Data

US 2011/0273823 A1 Nov. 10, 2011

Related U.S. Application Data

(60) Provisional application No. 61/332,099, filed on May 6, 2010.

(51) Int. Cl.
*G06F 1/16* (2006.01)
*H05K 5/00* (2006.01)
*H05K 7/00* (2006.01)

(52) U.S. Cl. ............ 361/679.56; 361/679.3; 455/575.1; 455/575.8; 29/592.1

(58) Field of Classification Search ............ 361/679.01, 361/679.02, 679.3, 679.55, 679.56; 455/575.1, 455/575.8; 29/592.1
See application file for complete search history.

(56) References Cited

U.S. PATENT DOCUMENTS

| | | | |
|---|---|---|---|
| 4,225,970 A * | 9/1980 | Jaramillo et al. | 455/90.3 |
| 5,568,357 A * | 10/1996 | Kochis et al. | 361/679.26 |
| 5,613,237 A * | 3/1997 | Bent et al. | 455/351 |
| 5,925,303 A | 7/1999 | Scheliga | |
| 5,968,564 A | 10/1999 | Welsh | |
| 6,028,765 A * | 2/2000 | Swindler et al. | 361/679.55 |
| 6,253,383 B1 | 7/2001 | Mallernee et al. | |
| 6,367,668 B1 | 4/2002 | Schwanenberg | |
| 6,437,238 B1 * | 8/2002 | Annerino et al. | 174/50 |
| 6,781,825 B2 * | 8/2004 | Shih et al. | 361/679.58 |
| 6,998,174 B2 | 2/2006 | Porter | |
| 7,322,600 B2 | 1/2008 | Inoue et al. | |
| 7,382,567 B2 | 6/2008 | Liao et al. | |
| 7,427,193 B2 | 9/2008 | Veilleux | |
| 7,436,653 B2 * | 10/2008 | Yang et al. | 361/679.01 |
| 7,636,244 B2 * | 12/2009 | Kriege et al. | 361/800 |
| 7,697,269 B2 * | 4/2010 | Yang et al. | 361/679.01 |
| 7,706,837 B2 * | 4/2010 | Ladouceur | 455/556.1 |
| 7,710,714 B2 * | 5/2010 | Rapp et al. | 361/679.01 |
| 7,940,287 B2 * | 5/2011 | Kim et al. | 349/60 |
| 7,953,436 B2 * | 5/2011 | Ladouceur | 455/556.1 |
| 8,148,633 B2 * | 4/2012 | Hung | 174/50 |

(Continued)

OTHER PUBLICATIONS

Office Action mailed Nov. 2, 2012, in corresponding Canadian patent application No. 2,735,492.

*Primary Examiner* — Adrian S Wilson
(74) *Attorney, Agent, or Firm* — Novak Druce + Quigg LLP (57) ABSTRACT

Electronic device comprising frame and trim. Trim wrapped around at least three sides of the frame. Trim comprising an outer piece and an inner assembly. Outer piece of substantially continuous flexible tactile material comprising a substantially elongate first side portion, a substantially elongate second side portion substantially parallel to the first side portion, and at least one substantially elongate cross portion connecting the first and second side portions. The inner assembly comprising a substantially rigid first side inner piece substantially coextensive with the outer piece first side portion; a substantially rigid second side inner piece substantially coextensive with the outer piece second side portion; and at least one substantially rigid inner cross piece. Each cross piece substantially coextensive with the short dimension of the outer piece cross portion, and shorter than the long dimension of the outer piece cross portion, thereby creating at least one gap in the inner assembly.

20 Claims, 7 Drawing Sheets

U.S. PATENT DOCUMENTS

| | | | |
|---|---|---|---|
| 8,164,899 B2 * | 4/2012 | Yamaguchi et al. | 361/679.55 |
| 2002/0101707 A1 * | 8/2002 | Canova et al. | 361/683 |
| 2006/0055839 A1 * | 3/2006 | Hirao et al. | 349/58 |
| 2006/0279924 A1 * | 12/2006 | Richardson et al. | 361/683 |
| 2007/0279859 A1 * | 12/2007 | Canova et al. | 361/683 |
| 2008/0048958 A1 * | 2/2008 | Kim et al. | 345/87 |
| 2008/0057285 A1 | 3/2008 | Polk | |
| 2008/0057286 A1 | 3/2008 | Polk | |
| 2008/0058006 A1 * | 3/2008 | Ladouceur | 455/556.1 |
| 2008/0081679 A1 * | 4/2008 | Kawasaki et al. | 455/575.8 |
| 2008/0084994 A1 * | 4/2008 | Chuang | 379/433.11 |
| 2008/0093764 A1 | 4/2008 | Ito | |
| 2009/0101384 A1 * | 4/2009 | Kawasaki et al. | 174/50.5 |
| 2009/0114556 A1 * | 5/2009 | Tai et al. | 206/320 |
| 2009/0175020 A1 * | 7/2009 | Zadesky | 361/818 |
| 2009/0208756 A1 | 8/2009 | Kimura | |
| 2009/0286575 A1 * | 11/2009 | Taniguchi et al. | 455/566 |
| 2010/0061040 A1 * | 3/2010 | Dabov et al. | 361/679.01 |
| 2010/0061044 A1 * | 3/2010 | Zou et al. | 361/679.01 |
| 2011/0050053 A1 * | 3/2011 | Deng | 312/223.1 |
| 2011/0050054 A1 * | 3/2011 | Chang et al. | 312/223.1 |

* cited by examiner

```
┌─────────────────────────────────┐
│  FORM ASSEMBLY IN A MOLDING     │
│  CONFIGURATION WITH FLEXIBLE    │
│  REGIONS FLEXED TO FACILITATE   │
│  REMOVAL FROM THE MOLD CAVITY   │
│              710                │
└─────────────────────────────────┘
                │
                ▼
┌─────────────────────────────────┐
│   CONFIGURE ASSEMBLY TO AN      │
│ ASSEMBLED CONFIGURATION ON THE  │
│  MOBILE COMMUNICATION DEVICE    │
│              720                │
└─────────────────────────────────┘
```

*FIG. 7*

MOLDED ASSEMBLY

CROSS-REFERENCE TO RELATED APPLICATIONS

This application claims priority to U.S. Provisional Application No. 61/332,099, filed on May 6, 2010, said application is hereby incorporated by reference in its entirety.

FIELD OF THE DISCLOSURE

The technology relates to molded items that, in an installed configuration, have at least on feature that impedes withdrawal from the mold. The technology further relates to processes and materials for manufacturing such items.

BRIEF DESCRIPTION OF THE DRAWINGS

Implementations of the present technology will now be described, by way of example only, with reference to the attached Figures, wherein.

DETAILED DESCRIPTION

Reference will now be made in detail to example implementations of the technology. Each example is provided by way of explanation of the technology only, not as a limitation of the technology. It will be apparent to those skilled in the art that various modifications and variations can be made in the technology without departing from the scope or spirit of the technology. For instance, features described as part of one implementation can be used on another implementation to yield a still further implementation. Thus, it is intended that the present technology cover such modifications and variations that come within the scope of the technology.

Figure 1:
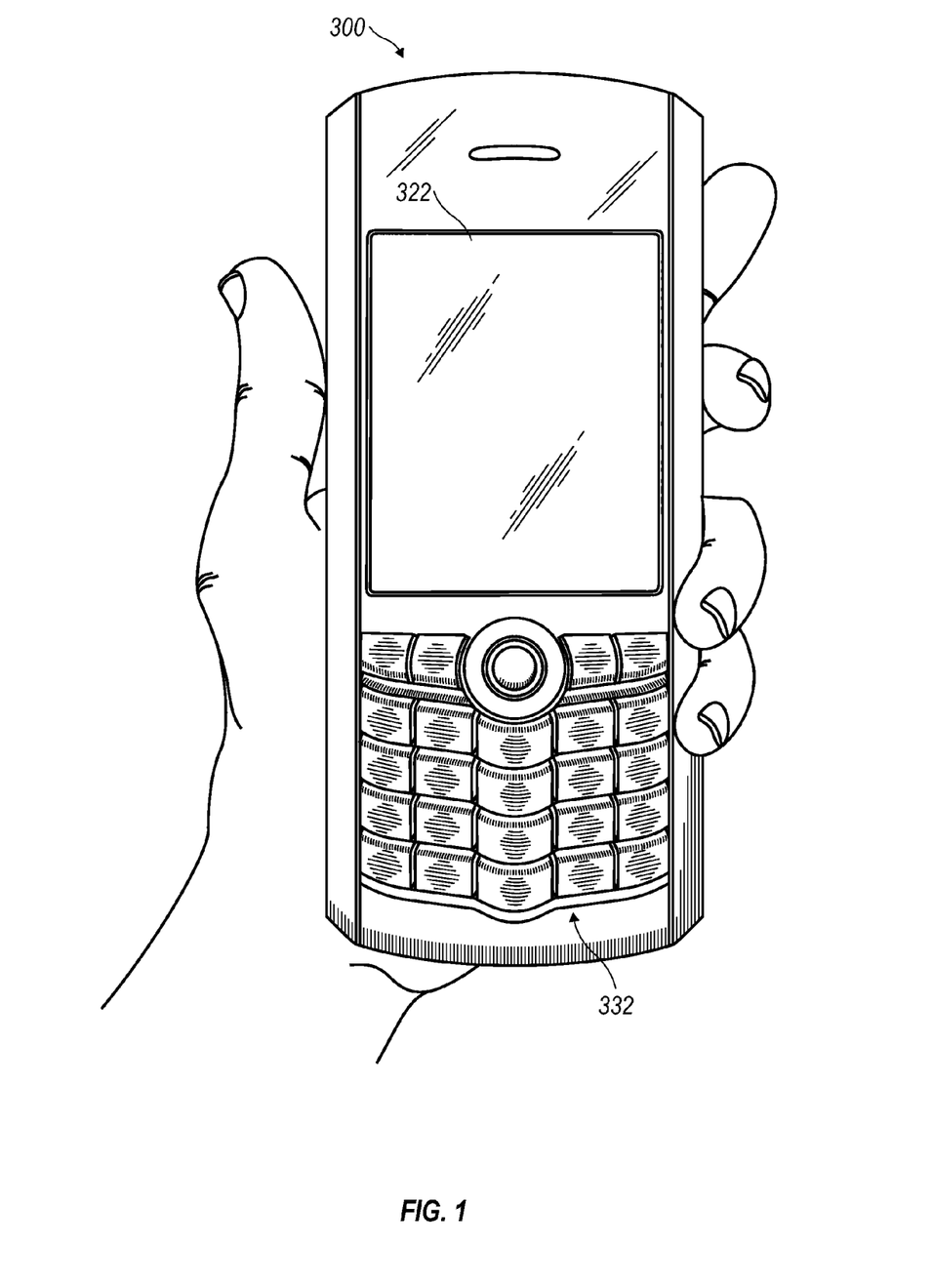
FIG. 1 illustrates a mobile communication device configured.
Figure 2:
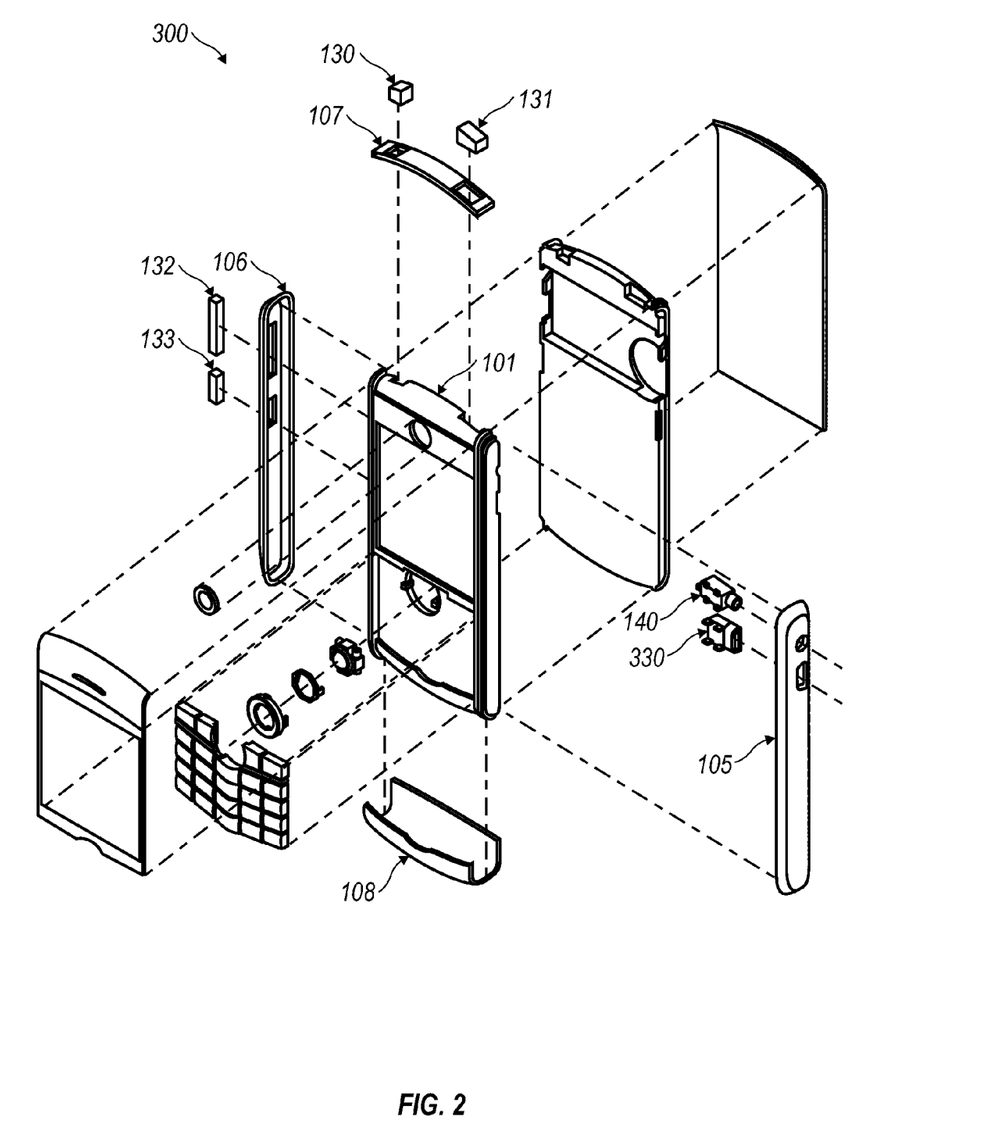
FIG. 2 is an exploded view of a mobile communication device.

Referring to FIG. 1 and FIG. 2 as an example context of the technology, a mobile communication device 300 is illustrated. The mobile communication device 300 can comprise a display 322 located above a keyboard 332 suitable for accommodating textual input to the mobile communication device 300. As shown, the mobile communication device 300 can be of uni-body construction, also known as a "candy-bar" design. In other implementations, the mobile communication device 300 can be a flip-type phone or a slider-type as well.

FIG. 2 illustrates some typical components that can be found in the assembly of the mobile electronic device 300. A support frame 101 cab constitute a base for many other components of the mobile communication device 300. The assembly can interconnect right side element 105, left side element 106, top element 107, and bottom element 108 with the support frame 101. Elements 106-108 typically are substantially rigid. For example, elements 106-108 can be formed of polycarbonate material. Such material can provide protection and strength to the support structure of the mobile communication device 300. Such material also can draw heat away from the interior of the mobile communication device through heatstaking Further, the material can be used to frame i) buttons (e.g., 130, 131, 132, 133) that can be attached to switches (not shown in FIG. 2), ii) input/output ports (for example, Universal Serial Bus (USB) port 330), and iii) jacks (for example, audio jack 140) via apertures in the elements.

It is typical to form elements such as 105-108 via injection molding. Injection molding is a manufacturing process for producing parts from both thermoplastic and thermosetting plastic materials. Material is fed into a heated barrel, mixed, and forced into a mold cavity where the material cools and hardens to the configuration of the mold cavity. After a product is designed, usually by an industrial designer or an engineer, molds are made by a moldmaker (or toolmaker) from metal, usually either steel or aluminium, and precision-machined to form the features of the desired part. Injection molding is widely used for manufacturing a variety of parts, from the smallest component to entire body panels of cars.

Injection molding is used to create many things such as wire spools, packaging, bottle caps, automotive dashboards, pocket combs, and most other plastic products available today. Injection molding is the most common method of part manufacturing. Injection molding is useful for producing high volumes of the same object. Some advantages of injection molding are high production rates, repeatable high tolerances, the ability to use a wide range of materials, low labor cost, minimal scrap losses, and little need to finish parts after molding. Some disadvantages of this process are expensive equipment investment, potentially high running costs, and the need to design moldable parts.

Most polymers may be used, including all thermoplastics, some thermosets, and some elastomers. In 1995 there were approximately 18,000 different materials available for injection molding and that number was increasing at an average rate of 750 per year. The available materials are alloys or blends of previously developed materials meaning that product designers can choose from a vast selection of materials, one that has exactly the right properties. Materials are chosen based on the strength and function required for the final part but also each material has different parameters for molding that must be taken into account. Common polymers like Epoxy and phenolic are examples of thermosetting plastics while nylon, polyethylene, and polystyrene are thermoplastic.

The edges of mobile communication device 300 present a substantially discontinuous and substantially hard surface to a user. As evident in FIG. 1 (showing a hand touching the sides of mobile communication device 300) and FIG. 2 (showing buttons on the top and both sides of mobile communication device 300), the mobile communication device 300 may be held by the sides, and buttons, e.g., 130, 131, at the top of the mobile communication device 300 may be engaged. Further the apertures for buttons, for example, apertures through top element 107, can present openings for ingress of fluids and particles. Further, the apertures can expose the buttons, the ports, and the jacks to the possibility of being inadvertently becoming detached, for example, by being pried loose from the mobile communication device.

The discontinuous hard tactile experience can be a disadvantage not only from an aesthetic perspective, but also from a functional perspective. For example, the hard surface may be more difficult to grasp securely. In addition, the possibility for ingress of fluids and particles presents another functional disadvantage to the use of a discontinuous hard tactile surface. Further, the possibility for device components becoming detached can be seen as a disadvantage in the design of mobile communication device 300.

One approach to addressing the discontinuous nature of substantially rigid elements 105-107 (and, in the alternate, bottom 108) is to form at least two adjacent elements as a single continuous element. However, this approach can present manufacturing disadvantages. For example, a single combination of adjacent elements from among elements 105-107 will typically include at least one feature, e.g., an undercut, which may impede withdrawal of the combined part from a mold. In another alternative, elements 105-108 can be formed in a single substantially rigid combination. But that approach presents the same disadvantage. While technology such as sliders can be used to facilitate molding of parts with features such as undercuts, these techniques typically present drawbacks such as increased manufacturing cost and complexity. Further such techniques result in the appearance of undesirable traits such as witness lines and seams in the part. Further yet, such an approach leaves disadvantages cited earlier such as the hard nature of the surface, the possibility for ingress of fluids and particles, and the possibility for device components to become detached unaddressed.

Implementations of the present technology coat at least two adjacent elements from among, e.g., 105-108, with a flexible, softer, more tactile, material that presents a continuous surface. This continuous surface also is sufficiently flexible to allow switches to be activate through the softer material covering the apertures in the underlying substantially rigid pieces. Further, at least one gap is created between the underlying rigid pieces to allow for at least one molding configuration to facilitate manufacturing, and at least one installed configuration that can include features that would otherwise inhibit manufacturing. The assembly can be altered between the molding configuration and the installed configuration by flexing the flexible material.

Figure 3:
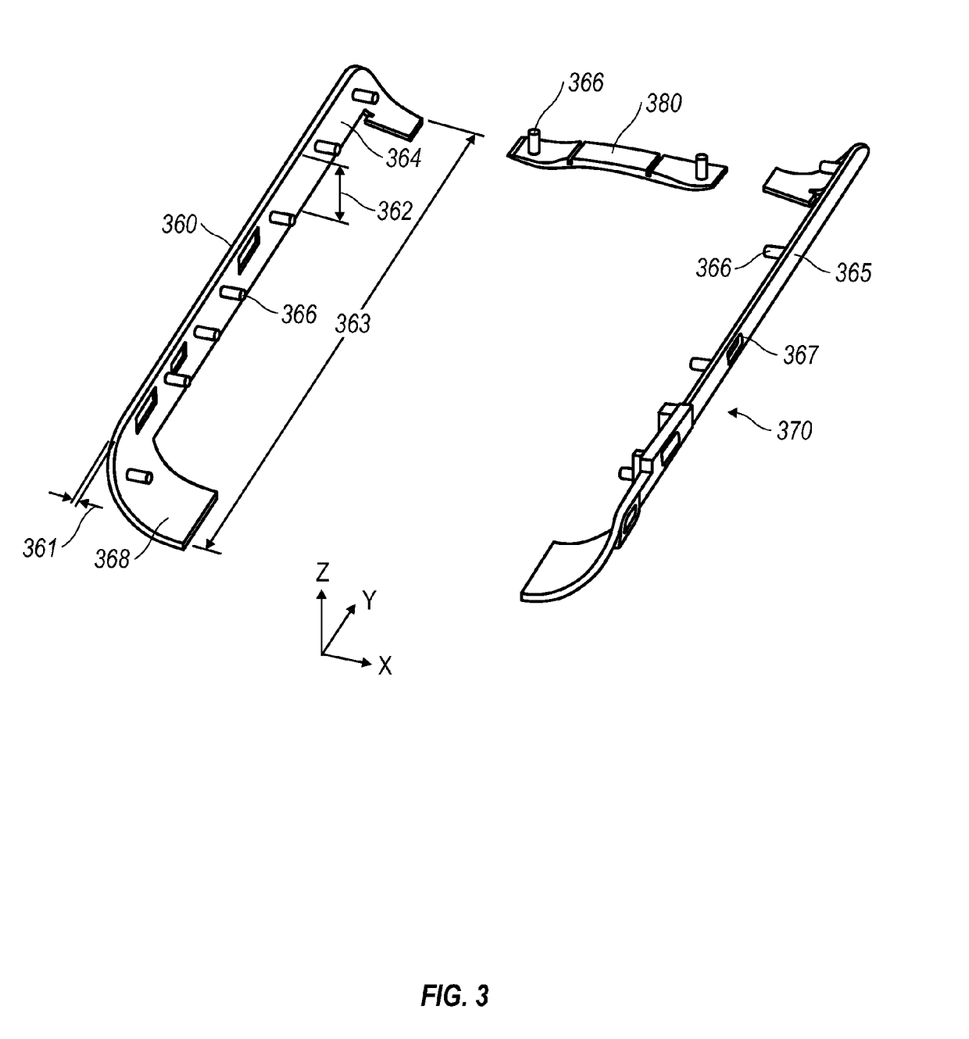
FIG. 3 illustrates a first side piece, a second side piece, and a first cross piece of implementations of the technology.

Referring to FIG. 3, a first side piece 360, a second side piece 370, and first cross piece 380 are shown. The first side piece 360 can be seen as analogous to the left side element 106 of FIG. 2. The second side piece 370 can be seen as analogous to the right side element 105 of FIG. 2. The first cross piece 380 can be seen as analogous to the top element 107 of FIG. 2.

The first side piece 360 and second side piece 370 can be formed of substantially rigid material. For example, a polycarbonate material can be used to form first side piece 360 and second side piece 370. In general, all kind of plastic materials can be used as long as the material has good adhesion to the substantially flexible outer component (to be described below). Each of first side piece 360 and second side piece 370 can have a substantially similar base thickness (e.g., 361), short primary dimension (e.g., 362), long primary dimension (e.g., 363), an inner face (e.g., 364), and an outer face (e.g., 365). Each of first side piece 360 and second side piece 370 can have heat staking pins 366 and apertures 367 for access to switches, jacks, and input/output ports. In the illustrated implementation, each of first side piece 360 and second side piece 370 has a curved portion 368 corresponding to a transition between the side of a mobile communication device 300 and a back face or a front face of the mobile communication device 300. The first side piece 360 can be curved along the first side piece 360 short dimension (i.e., with a radius center toward the other side piece in an installed configuration). The second side piece 370 can be curved along the second side piece short dimension (i.e., with a radius center toward the other side piece in an installed configuration).

The first cross piece 380 can be formed from the same material as the first side piece 360 and the second side piece 370, or the first cross piece 380 can be formed from any other suitable substantially rigid material having good adhesion to the outer component. Like the first side pieces 360 and the second side piece 370, the first cross piece 380 can have a thickness that is less than the first cross piece 380 short primary dimension, and the first cross piece 380 can have a short dimension that is less than the first cross piece 380 long primary dimension, along with heat stakes 366. In the illustrated implementation, In some implementations, the cross piece 380 can have apertures and guide features. In some implementations, a second cross piece can be included in the assembly between the side pieces, e.g., at the end distal from the first cross piece.

Figure 4:
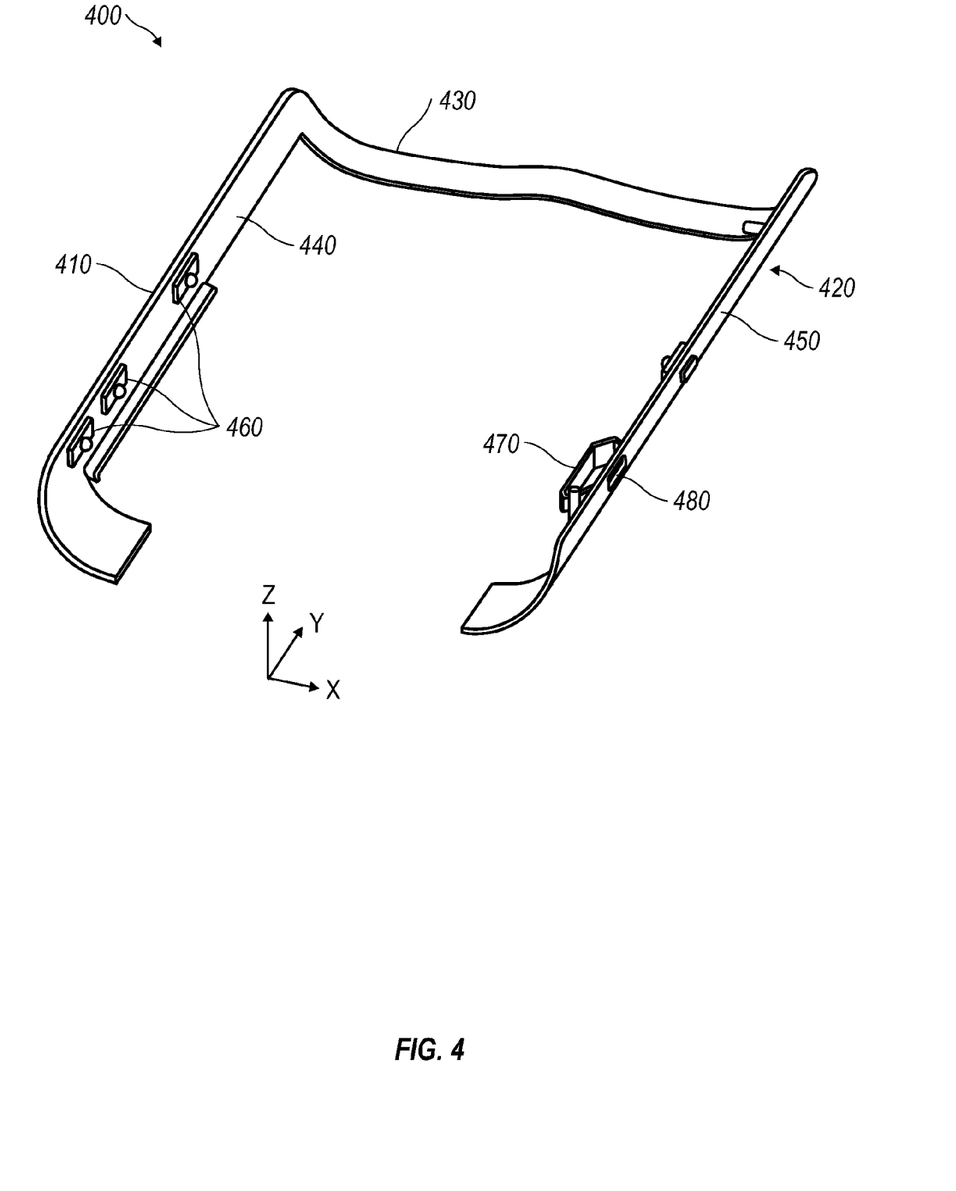
FIG. 4 illustrates an outer piece of implementations of the technology.

Referring to FIG. 4, the outer piece 400 can be formed from substantially flexible material. For example, a thermoplastic elastomer (TPE), a thermoplastic polyurethane (TPU) can be used to form the outer piece 400. The illustrated outer piece 400 has a first side portion 410, a second side portion 420, and a first spanning portion 430. In some implementations, the outer piece includes a additional spanning portions spanning the distance between the side pieces. For example, a second spanning portion can be located at the opposite end from spanning portion 430. Though shown positioned at an end of the side pieces and substantially normal to the side pieces, the spanning portion(s) can be located at other points along the long primary dimension of the side pieces and can be oriented other than normal to one more side pieces. For example, spanning portions can be configured as diagonal pieces. The illustrated cross piece 400 has an inner face 440 and an outer face 450. In the illustrated outer piece 400, first side piece 410 and second side piece 420 each can include at least one button feature 460. In the illustrated implementation, the second side piece 420 includes a port skirt feature 470, and apertures 480.

A button feature 460 is shown in the implementation illustrated in FIG. 4. The button feature 460 can include region 460a on the outer piece outer surface. The button feature 460 also can includes post 460b. Post 460b is in the direction of the outer piece inner surface 440. Post 460b can activate a switch in the mobile communication device 300 when the outer piece outer surface 450 is depressed at the region 460a.

Figure 5:
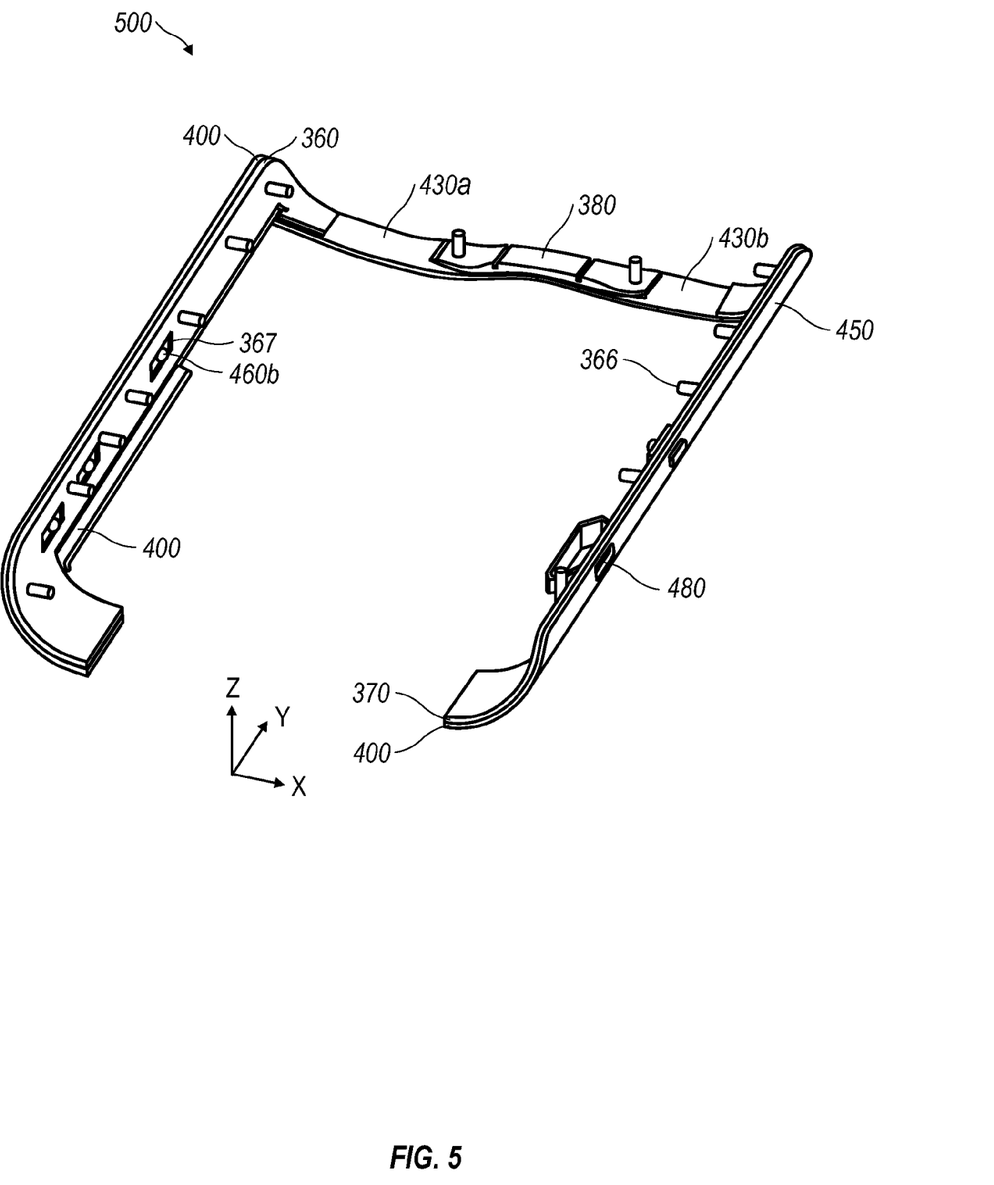
FIG. 5 illustrates an implementation of an assembly of the technology.

Referring to FIG. 5, an implementation of an assembled configuration 500 of a trim assembly of the technology in an installed orientation is illustrated. First side piece 360, second side piece 370, and first cross piece 380 are shown positioned abuttingly "inside" (i.e., closer to the interior of a mobile communication device 300 that the piece can be used in) outer piece 400 with the edges of the respective pieces substantially aligned. The example of FIG. 5 includes reference numerals to various aspects of the pieces 360, 370, 380, 400 described elsewhere herein.

The outer piece outer face 450 can form the outer face of the assembled configuration 500. The substantially rigid inner faces of the first side piece 360, the second side piece 370, and the first cross piece 380 can form part of the inner face of the assembly. The remaining part of the inner face of the assembly can be formed by segments, 430a and 430b, of the substantially flexible outer assembly spanning portion inner face 430. While in the illustrated implementation the flexible regions, region 430a and region 430b, of the assembly 500 can be disposed substantially symmetric about the first cross piece 380, other implementations have only a single exposed flexible region, or multiple exposed flexible regions disposed symmetrically or asymmetrically.

In the illustrated configuration, the substantially flexible outer piece 400 can be pressed at region 460a as described above to activate corresponding switches in a mobile communication device 300 when the assembly is installed on the mobile communication device 300. Also, apertures, e.g., 480 can accept interface structures (e.g., USB connectors) from outside the mobile communication device 300 for connection to a device port(s) exposed through the aperture. In some implementations, the apertures can have removable covers (for example made of the same material as the outer piece) flexibly attached to the outer piece 400. Further, heat staking pins 366 can be used to attach the assembly to a mobile communication device 300 and facilitate the conduction of heat from the interior of the mobile communication device toward the exterior of the mobile communication device.

Some implementations of the assembly include a second spanning portion of the outer piece and a second cross piece between the respective side pieces and side portions.

In the illustrated implementation, the cross piece 380 is substantially centered on the outer piece spanning portion 430, exposing flexible regions 430a and 430b. In other implementations, placement of cross pieces (e.g., 380) can create one, or more than two, regions of flexibility in the assembly, and can create asymmetrical arrangements of such regions.

Figure 6:
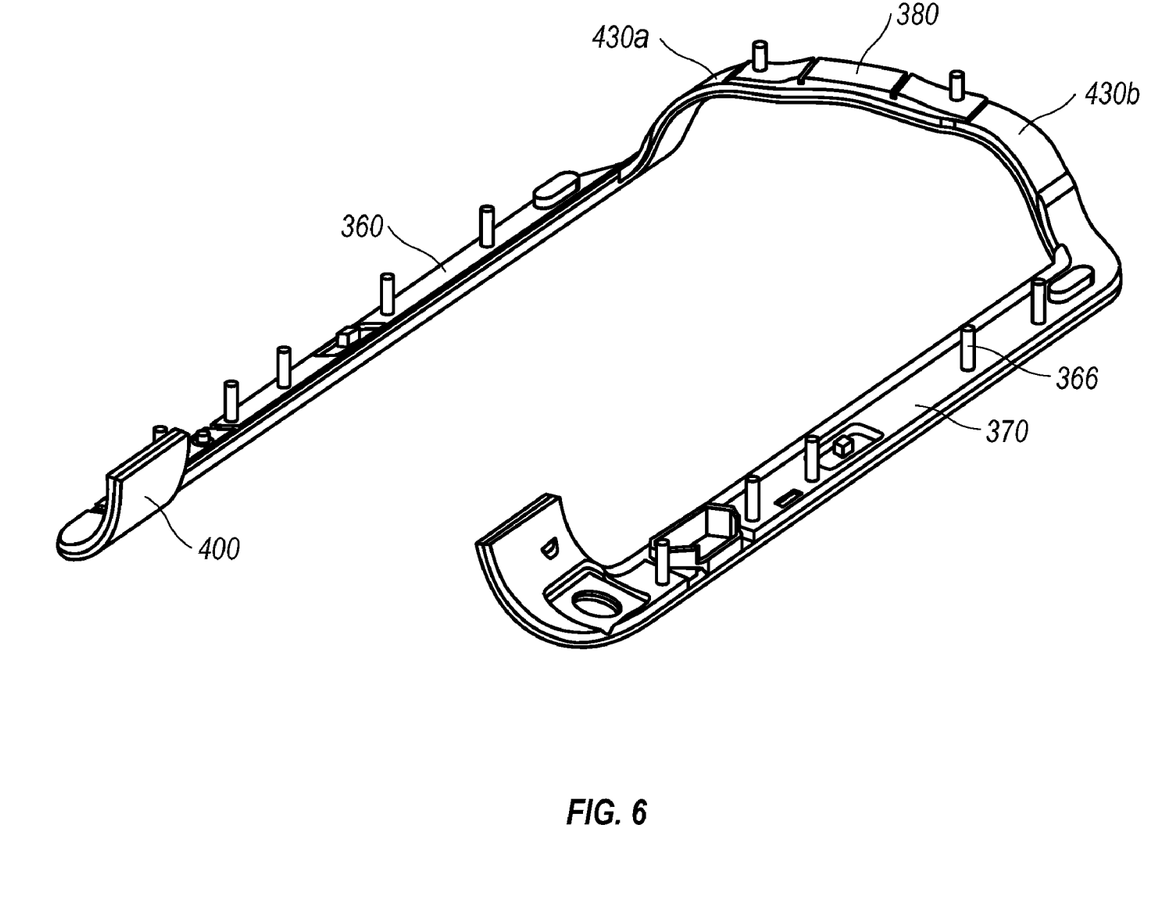
FIG. 6 illustrates an implementation of an assembly of the technology as extracted from a mold.

Referring to FIG. 6, a molding configuration 600 of the assembly is shown. Several features identified in FIG. 1 through FIG. 5 are indicated in FIG. 6 as reference points. Substantially flexible regions 430a and 430b are bent generally about the y-axis when compared to the installed configuration 500. In the molding configuration 600, the assembly orients most features substantially in the direction of the z-axis, facilitating removal of the assembly from a mold cavity.

Figure 7:
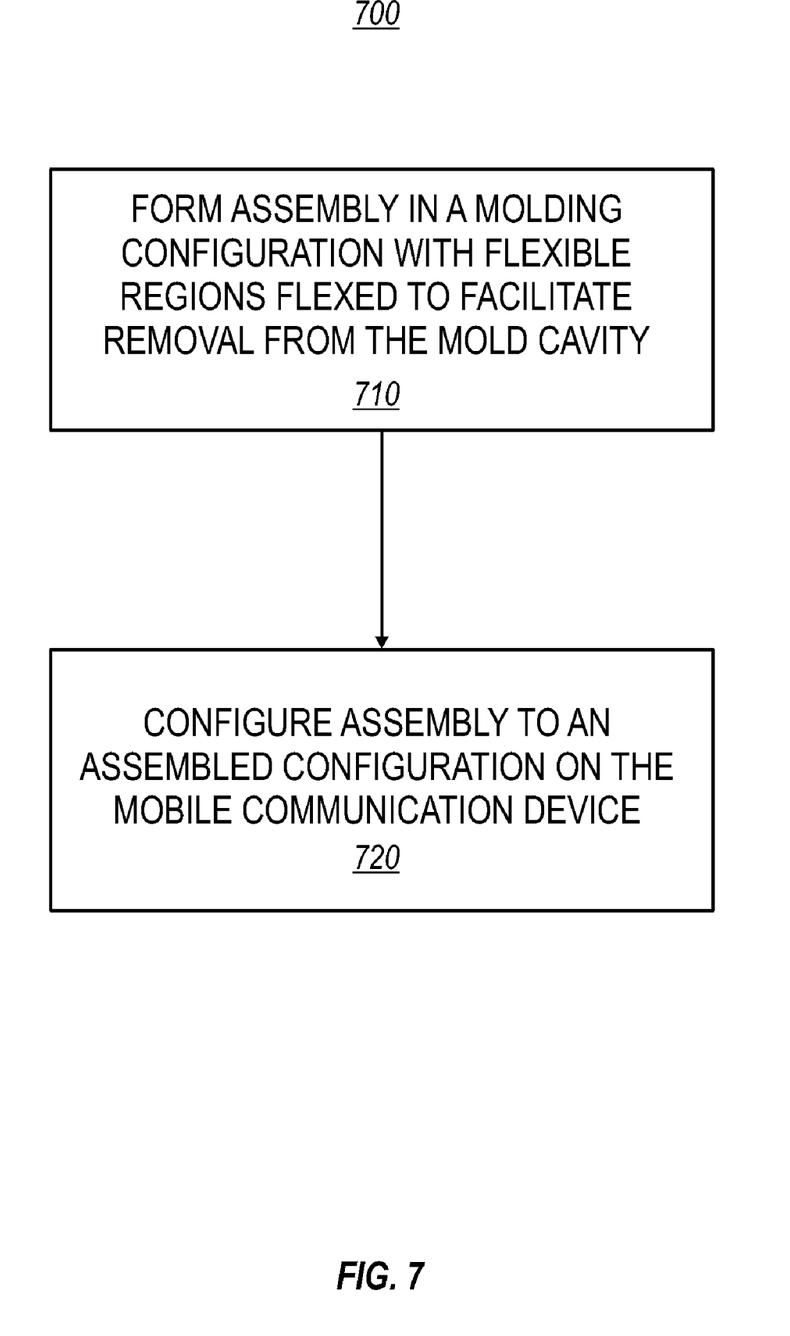
FIG. 7 illustrates methods of the technology.

Referring to FIG. 7, methods 700 of the technology are illustrated. First, the assembly is formed, e.g., via a 2-shot molding process, in a molding configuration 710, i.e., with flexible regions 430a and 430b flexed to facilitate removal from the mold cavity. Next, the assembly is configured 720 to an assembled configuration 500 on the mobile communication device 300.

In summary, using the flexible nature of certain sections of the outer piece, the trim assembly is molded in a molding configuration such that the elements of the assembly are oriented for substantially unidirectional withdrawal from the mold cavity after the second shot. This reduces, if not eliminates, the need for technology such as sliders; giving no slider-caused witness lines. This approach is possible, at least in part because of flexible portions of the outer piece.

We claim:

1. An electronic device comprising:
   a frame; and
   a trim assembly, the trim assembly:
      wrapped around at least three sides of the frame, and comprising:
         an outer piece of substantially continuous flexible tactile material comprising:
            a substantially elongate first side portion,
            a substantially elongate second side portion substantially parallel to the outer piece first side portion, and
            at least one substantially elongate cross portion connecting the first and second side portions;
         an inner assembly comprising:
            a substantially rigid first side inner piece substantially coextensive with the outer piece first side portion;
            a substantially rigid second side inner piece substantially coextensive with the outer piece second side portion; and
            at least one substantially rigid inner cross piece, each inner cross piece:
               substantially coextensive with the short dimension of the outer piece cross portion, and
               shorter than the long dimension of the outer piece cross portion, thereby creating at least one gap in the inner assembly.

2. The electronic device of claim 1, wherein each inner cross piece is positioned symmetrically on the long dimension of one outer piece cross portion.

3. The electronic device of claim 1, wherein each inner cross piece is positioned asymmetrically on the long dimension of one outer piece cross portion.

4. The electronic device of claim 1, wherein the outer piece comprises a first substantially elongate cross portion connecting the distal end of the first side portion to the distal end of the second side portion, and the first substantially elongate cross portion is oriented substantially perpendicular to the first side portion and the second side portion.

5. The electronic device of claim 3, wherein each inner cross piece is positioned symmetrically on the long dimension of one outer piece cross portion.

6. The electronic device of claim 3, wherein the outer piece comprises a second substantially elongate cross portion connecting the distal end of the first side portion to the proximal end of the second side portion, and the second substantially elongate cross portion is oriented substantially perpendicular to the first side portion and the second side portion.

7. The electronic device of claim 6, wherein each inner cross piece is positioned symmetrically on the long dimension of one outer piece cross portion.

8. A method of making a mobile electronic device, comprising:
   in a mold,
      forming a trim assembly in a molded configuration, the forming comprising:
         forming an inner shot;
         forming an outer shot;
      wherein:
         each shot utilizes no sliders;
         trim assembly features are oriented substantially parallel to direction of withdrawal from the mold; and
         the trim assembly comprises:
            an outer piece of substantially continuous flexible tactile material comprising:
               a substantially elongate first side portion,
               a substantially elongate second side portion substantially parallel to the outer piece first side portion, and
               at least one substantially elongate cross portion connecting the first and second side portions;
            an inner assembly comprising:
               a substantially rigid first side inner piece substantially coextensive with the outer piece first side portion;
               a substantially rigid second side inner piece substantially coextensive with the outer piece second side portion; and
               at least one substantially rigid inner cross piece, each inner cross piece:
                  substantially coextensive with the short dimension of the outer piece cross portion, and
                  shorter than the long dimension of the outer piece cross portion, thereby creating at least one gap in the inner assembly, and
   out of the mold
      bending the trim assembly at the at least one gap to an installed configuration, and attaching the bent trim assembly to a frame of the device.

9. The method of claim 8, wherein each inner cross piece is positioned symmetrically on the long dimension of one outer piece cross portion.

10. The method of claim 8, wherein each inner cross piece is positioned asymmetrically on the long dimension of one outer piece cross portion.

11. The method of claim 8, wherein the outer piece comprises a first substantially elongate cross portion connecting the distal end of the first side portion to the distal end of the second side portion, and the first substantially elongate cross portion is oriented substantially perpendicular to the first side portion and the second side portion.

12. The method of claim 10, wherein each inner cross piece is positioned symmetrically on the long dimension of one outer piece cross portion.

13. The method of claim 10, wherein the outer piece comprises a second substantially elongate cross portion connecting the distal end of the first side portion to the proximal end of the second side portion, and the second substantially elongate cross portion is oriented substantially perpendicular to the first side portion and the second side portion.

14. The method of claim 13, wherein each inner cross piece is positioned symmetrically on the long dimension of one outer piece cross portion.

15. A trim assembly comprising:
an outer piece of substantially continuous flexible tactile material comprising:
a substantially elongate first side portion,
a substantially elongate second side portion substantially parallel to the outer piece first side portion, and
at least one substantially elongate cross portion connecting the first and second side portions;
an inner assembly comprising:
a substantially rigid first side inner piece substantially coextensive with the outer piece first side portion;
a substantially rigid second side inner piece substantially coextensive with the outer piece second side portion; and
at least one substantially rigid inner cross piece, each inner cross piece:
substantially coextensive with the short dimension of the outer piece cross portion, and
shorter than the long dimension of the outer piece cross portion, thereby creating at least one gap in the inner assembly.

16. The trim assembly of claim 15, wherein each inner cross piece is positioned symmetrically on the long dimension of one outer piece cross portion.

17. The trim assembly of claim 15, wherein the outer piece comprises a first substantially elongate cross portion connecting the distal end of the first side portion to the distal end of the second side portion, and the first substantially elongate cross portion is oriented substantially perpendicular to the first side portion and the second side portion.

18. The trim assembly of claim 17, wherein each inner cross piece is positioned symmetrically on the long dimension of one outer piece cross portion.

19. The trim assembly of claim 17, wherein the outer piece comprises a second substantially elongate cross portion connecting the distal end of the first side portion to the proximal end of the second side portion, and the second substantially elongate cross portion is oriented substantially perpendicular to the first side portion and the second side portion.

20. The trim assembly of claim 19, wherein each inner cross piece is positioned symmetrically on the long dimension of one outer piece cross portion.

* * * * *